United States Patent Office 3,299,122
Patented Jan. 17, 1967

3,299,122
9,10-DIHYDRO-9-MONOTHIOANTHROIC ACID
William F. Wolff, Park Forest, Ill., assignor to Standard
Oil Company, Chicago, Ill., a corporation of Indiana
No Drawing. Filed Sept. 21, 1962, Ser. No. 225,373
1 Claim. (Cl. 260—500)

This invention relates to a preparation of a salt of a monobasic acid from a polycyclic aromatic compound and to the salt, its acid and other derivatives as compositions of matter, and more particularly to the preparation of an alkali metal salt of a monobasic acid from a polycyclic aromatic compound in the presence of ammonia, and to the alkali metal salt, its acid and ester as compositions of matter.

The term "monobasic acid" refers to an acid having one acidic group which may be carboxyl (—COO—), monothiocarboxyl (—COS—), dithiocarboxyl (—CSS—), sulfonyl (—SOO—), and the like.

It has been discovered that an alkali salt of a monobasic acid is produced from the reaction of an anhydride (such as carbon dioxide) of a weak inorganic dibasic acid with a mixture of a polycyclic aromatic compound, liquid ammonia, and an alkali metal. The acid (produced in the form of its salt) includes both aromatic acids and partially hydrogenated aromatic acids such as naphthoic and dihydronaphthoic acids. It has also been discovered that the degree of hydrogenation of the organic residue (acid less acidic group) of the monobasic acid is affected by the presence or absence of a cosolvent such as toluene and/or a gas containing molecular oxygen.

The alkali salt, its acid and other derivatives produced by the process of this invention are useful for many purposes. Some, such as dl-1,4-dihydro-1-naphthoic acid and its acidic derivatives are useful as agricultural chemicals and particularly as plant-growth hormones. Others, such as the sulfur containing acids (and derivatives), especially the thiocarboxy acids (including monothio and dithio) are useful as lubricating oil additives. These thiocarboxy acids, especially the monothiocarboxy (—COS—)

acids, are also useful as intermediates in the preparation of other compounds such as aldehydes, amines, and isocyanates.

The alkali metal salt of this invention is prepared from the reaction of an anhydride of a weak inorganic dibasic acid with a mixture of a polycyclic aromatic compound, liquid ammonia, and an alkali metal. The product from this reaction contains an alkali metal salt of a monobasic acid derived from a polycyclic aromatic compound. A cosolvent may also be present or a gas containing molecular oxygen may be utilized together with the anhydride to vary the degree of hydrogenation of the monobasic acid. The alkali metal salt may also be treated with a gas containing molecular oxygen to increase the relative amounts of the salt of the aromatic monobasic acid in the product and may also be converted to the acid or ester.

An anhydride of a weak inorganic dibasic acid is reacted with the above described mixture to produce a product containing the desired alkali metal salt. Such anhydrides include carbon dioxide, carbonyl sulfide, carbon disulfide and sulfur dioxide. Particularly advantageous are the anhydrides, such as carbon dioxide, carbonyl sulfide and carbon disulfide of the weaker dibasic acids because of the higher yields produced by their use. An especially desirable anhydride is carbon dioxide because of its availability and the desirable acids produced by its use.

Generally and preferably the anhydrides which are normally gaseous, are contacted in gaseous form with the reactive mixture; although they may be contacted in other forms such as solid carbon dioxide.

The second reactant is a mixture which results from the combination of a polycyclic aromatic compound, liquid ammonia and an alkali metal. The reactive component of the mixture is thought to be a complex and therefore the polycyclic aromatic compound should be one which will form such a complex. A convenient measure of the desirability of a polycyclic aromatic compound is given by its half-wave reduction potential. Polycyclic aromatic compounds having half-wave potentials equal to or less negative than about that for diphenyl are very suitable for producing the alkali salt of the monobasic acid, while aromatic compounds such as toluene that have no measurable half-wave potential or potentials more negative than diphenyl are not suitable for producing the desired alkali metal salt.

Methods for measuring half-wave potentials of aromatic compounds are known and described in the literature such as Kolthoff, I. M., and Lingane, J. J., "Polarography," 2nd ed., 1952, and Kirk, R. E., and Othmer, D. F., "Encyclopedia of Chemical Technology," vol. 10, pages 886–901. Half-wave potentials of typical polycyclic aromatic compounds are —2.70 volts for diphenyl, —2.50 volts for naphthalene and —1.94 volts for anthracene.

Suitable polycyclic aromatic compounds are therefore those having half-wave reduction potentials equal to or below about —2.70 volts, preferably conjugated polycyclic aromatic compounds, and especially polyphenyls and polynuclear aromatic compounds with the latter group being of particular preference. These compounds (conjugated polycyclic aromatics, polyphenyls, and polynuclear aromatics) are readily identifiable and those of greater preference are readily available and result in very desirable yields of the desired alkali metal salts. Examples of suitable polycyclic aromatic compounds are polyphenyls such as diphenyl, triphenyl, quarterphenyl, hexaphenyl, etc.; polynuclear aromatics such as naphthalene, anthracene, naphthacene, phenanthracene chrysene, pyrene, etc.; and heterocyclic aromatics such as acridine, phenanthridine, thionaphthalene, etc.

The polycyclic aromatic compounds may be substituted or unsubstituted. The preferred substituents are hydrocarbons such as the lower alkyls (1–6 carbon atoms), especially methyl, and halogens, especially chlorine. Substituents such as amino groups and the like are not preferred.

Ammonia is also required in the preparation of the reactive mixture and it is preferred to add it in liquid form to the defined polycyclic aromatic compound prior to or after the alkali metal. When ammonia is not utilized the monobasic acids (as salts) are generally not produced, although other solvents such as dimethyl ether with naphthalene, sodium and carbonyl sulfide produce other acids (as salts).

An alkali metal is also utilized in the preparation of the reactive mixture. Examples of alkali metals are lithium, sodium, potassium, rubidium and cesium; preferably, potassium and sodium; and especially sodium because of the highly desirable results from these metals and their availability. The yields from sodium are especially desirable.

The reaction is carried out to obtain a product containing an alkali metal salt of a monobasic acid, the acid being a derivative of the defined polycyclic aromatic compound. The derivative is descriptive of a monobasic acid of the polycyclic aromatic compound and its partially hydrogenated forms. Such derivatives may also be considered as an acidic group and a residue with the residue being a radical of the polycyclic aromatic compound and its partially hydrogenated derivatives. In many instances, the monobasic acids (as alkali metal salts) of both the hydrogenated and nonhydrogenated polycyclic aromatic compounds are produced in the reaction. The reaction produces highly desirable alkali metal salts of monobasic acids from the defined polycyclic aromatic compounds including partially hydrogenated (especially dihydrogenated) and non-hydrogenated acid derivatives of the above listed examples. Examples of alkali metal salts of monobasic acids which are very suitably prepared by this process are salts of naphthoic acids and dihydronaphthoic acids and including dl-1,4-dihydro-1-naphthoic acid; the anthroic and dihydroanthroic acids such as 9,10-dihydro-9-anthroic acid and 9,10-dihydro-9-monothio anthroic acid.

A particular benefit of the process of this invention is the production of monobasic acids from hydrocarbon substituted polycyclic aromatic compounds such as methyl naphthalenes without the destruction of the substituents. Common methods of oxidizing these substituted naphthalenes generally destroy the substituent.

The reaction is generally carried out under substantially anhydrous conditions, and at conditions of temperature and pressure at which liquid ammonia is stable. Typically, the temperature is below −20° C. and preferably at or below −33° C. since the reactions can be carried out at this latter temperature under atmospheric pressure. Conventional cooling systems such as a cooling bath of Dry Ice and acetone may be employed to maintain the desired temperature.

Generally, an excess of the polycyclic aromatic compound is desirable. A typically desirable weight ratio of naphthalene to sodium is 6:1. A desirable ammonia to naphthalene weight ratio is 3:1. Reduction of the ratio below this value may decrease yields.

Initially, a complex is formed in the liquid mixture of polycyclic aromatic compound, liquid ammonia and alkali metal as indicated by the presence of a deep color. The anhydride is then reacted with the mixture until the color becomes much lighter. Typically, a suitable time is approximately one hour when carbon dioxide at the rate of 200 ml./min. is reacted with a mixture of 6 grams of naphthalene, 1 gram of sodium metal and 20 ml. of liquid ammonia. When larger amounts of the reactants are employed, such as 90 grams of naphthalene, 30 grams of sodium, 600 ml. of ammonia and 100 ml. of toluene (later described as a cosolvent) the process is carried out for approximately 3–4 hours with the carbon dioxide rate being 200 ml./min.

The reaction also proceeds in the presence of a cosolvent. Usually these cosolvents have a greater density than ammonia and those providing particularly good results are immiscible with ammonia. Generally, the partially hydrogenated monobasic acids (as the alkali metal salts) are produced when a cosolvent is utilized. Cyclic hydrocarbons such as toluene, Tetralin, and Decalin are particularly desirable, and very desirable yields result from their use. Other cosolvents such as diethyl ether and the methyl ethers are also suitable, especially the methyl ethers [having at least one methyl group attached to an oxy (—O—) group in the ether] such as dimethyl ether, methyl ethyl ether, methyl propyl ether, dimethoxy ethane, dimethoxy propane, dimethoxy butane and the like, with dimethyl ether being preferred because of its ready availability and low cost.

A gas containing molecular oxygen such as air or oxygen may also be present. Generally this gas is added along with the defined anhydride. At least part of the alkali metal salt is then produced in a non-hydrogenated form (non-hydrogenated polycyclic aromatic residue). This may be particularly useful when the reaction is carried out in the presence of the above defined cosolvent, since the partially hydrogenated acids (as salts) are otherwise normally produced. The defined alkali metal salt may also be treated with the gas containing molecular oxygen to produce non-hydrogenated acids (as salts) where otherwise the hydrogenated form would be predominantly produced.

The alkali metal salt produced in the above defined reaction may be recovered by any of known procedures such as by washing the reaction product with water to produce an aqueous solution of the salt and evaporating the water under vacuum. Derivatives of the salt may also be produced such as the acid or ester. One conventional method to produce the acid is to prepare an aqueous solution of the salt and then to acidify the solution to precipitate the acid. The precipitate is then recovered by filtration. Some precautions should be followed in preparing sulfur containing acids, especially the thiocarboxy acids (monothio and dithio), since they may tend to hydrolyze to the carboxy acids in the presence of air and moisture.

Preparation of the ester is also accomplished with conventional procedures. Generally, the salt solution or reaction product contains unreacted starting materials. An organic solvent such as toluene is utilized to wash the reaction product and remove unreacted hydrocarbons. The remaining material is then treated with an alkylating agent. Very suitable alkylating agents are the esters of acids which are stronger than the defined monobasic acids. Examples of these alkylating agents are organic halides such as benzyl chloride, allyl bromide and the like, usually with triethylamine as a promoter, chlorinated esters having a reactive chloro group such as ethylchloroformate, organic derivatives of sulfuric acid, such as diethylsulfate, and the like. When a hydrogen halide is present during the treatment of the salt with an alkylating agent, at least part of the ester of the monobasic acid is obtained as a partially hydrogenated form (generally dihydrogenated) in place of the defined polycyclic aromatic compound. Hydrogen chloride is especially suitable for this purpose. Rather than utilizing hydrogen or another hydrogen halide, a compound such as ethylchloroformate may be employed as both an alkylating agent and a source of hydrogen chloride.

The reaction between the alkylating agent and the alkali metal salt results in a product containing the desired ester. Usually the product is washed with additional organic solvent, filtered to remove solids, and heated to remove the solvent and unreacted alkylating agent. A typical preparation of an ester in which benzyl chloride and triethylamine are utilized, proceeds at a temperature in the order of 100° C. under a nitrogen atmosphere. The product is cooled, diluted with toluene, and filtered. The filtrate is heated to about 50° C. at a pressure below 0.1 mm. Hg to remove toluene and excess benzyl chloride.

The yields of the desired salts, acids, and esters usually depend on the particular anhydride employed. Generally, the yields from the anhydrides of the weaker inorganic dibasic acids produce higher yields. For example, a typical reaction employing carbon disulfide produces higher yields of an ester than a reaction employing carbon dioxide. It is thought that the reaction mechanism changes when anhydrides such as carbon dioxide of stronger dibasic acids are employed.

The process of this invention also produces valuable by-products. For example, the benzyl ester of benzyl naphthoic acid is produced from the esterification of the sodium salt of naphthoic acid in the presence of unreacted naphthalene utilizing benzyl chloride and triethylamine for esterification.

The following examples illustrate several embodiments of this invention. It will be understood that these examples are for illustrative purposes only and do not purport to be wholly definitive with respect to conditions or scope.

Example I 6.0 g. of naphthalene, 40 ml. of Tetralin, and 0.60 g. of sodium metal were charged under a nitrogen atmosphere to a 100 ml., 3-necked flask containing an uncovered magnetic stirring bar. The flask was fitted with a 3-way stopcock for introducing gases into the vapor phase above the liquid, and a knock-back condenser followed by a gas bubbler filled with white oil. A small magnetic stirring motor was centered below the flask. A mixture of nitrogen and ammonia was passed through the flask and the magnetic stirrer was turned on. After the naphthalene dissolved in the Tetralin, the knock-back condenser was filled with a mixture of Dry Ice and acetone. Approximately 15 minutes after the first drop of liquid ammonia was knocked back by the condenser, the flask contained about 30 ml. of refluxing liquid ammonia, and ammonia introduction was discontinued. The mixture was allowed to reflux, with stirring, for approximately 20 additional minutes and then the knock-back condenser was replaced by a glass-wool plug. Carbon dioxide gas, at a rate of about 200 ml. per minute, and a slow stream of nitrogen were then introduced into the gas phase, with continued stirring. Within about 12 minutes essentially all the deep color associated with the original product had been discharged. Distilled water was then added after about three-quarters of an hour. Contact of the contents of the flask with a total of 100 ml. of water gave 45 ml. of an organic top phase and 105 ml. of an aqueous bottom phase. 85 percent (by weight) phosphoric acid was added dropwise to 41 ml. of the aqueous phase (filtered through two filter papers to remove the turbidity) until the mixture was acid to litmus. An initially liquid organic phase separated, and then crystallized to give a pink-tinted white solid and a cloudy white solution. After standing overnight, the mixture consisted of white crystals in a water-white liquid. The mixture was then filtered and the crystals were washed with 9 ml. of distilled water, in three portions. After drying, the crystals weighed 0.29 g., which corresponded to 0.74 g. of organic acid from the total aqueous phase. The acid melted at 72–81° C. and had a neutral equivalent of 166. The acid was the dl-1,4-dihydro-1-naphthoic acid, which has been reported to melt at 75° C., 86.5° C., and 91° C., and has a neutral equivalent of 174. Dihydronaphthalene dicarboxylic acids have much higher melting points (229–30° C. for 1,4-dihydronaphthalene dicarboxylic acid) and a neutral equivalent of 109. The 0.74 g. of organic acid corresponds to approximately a 33 mole percent yield based on a theoretical yield of 1 mole of acid per 2 atomic weights of sodium.

The acid obtained by the above process was further demonstrated to be the dl-1,4-dihydro-1-naphthoic acid by dissolving 0.2 g. of the acid in 10 ml. of 20 percent (by weight) sodium hydroxide, heating the solution for 1 hour in a steam bath, and adding 85 percent (by weight) phosphoric acid dropwise to the product. A white crystalline acid resulted from this treatment with a melting point of 110–121° C. The literature reports this process for converting 1,4-dihydro-1-naphthoic acid to 3,4-dihydro-1-naphthoic acid and reports melting points for this acid (3,4-dihydro-1-naphthoic acid) of 112°, 121° and 125° C. In addition, mass spectrographic analysis of the acid produced peaks corresponding to the presence of 96 mole percent dihydronaphthoic acids, 3.9 mole percent naphthoic acids, and 0.1 mole percent methyldihydronaphthoic acids.

The above results demonstrate that dl-1,4-dihydro-1-naphthoic acid was prepared by (1) passing carbon dioxide into a solution derived from naphthalene, Tetralin, sodium metal, and ammonia, and (2) acidifying an aqueous solution of the product. The acid melted at 72–81° C. compared to the reported values of 75° C., 86.5° C., and 91° C.; had a neutral equivalent of 166 compared to the theoretical value of 174; was isomerized to the predicted acid (3,4-dihydro-1-naphthoic acid); and was identified by mass spectrography.

Examples II–VI

The process described in Example I was carried out with cosolvents in addition to Tetralin (and with Tetralin) and the yield for each run was measured. Approximately 6.0 g. of naphthalene, 40 ml. of cosolvent and 30 ml. of ammonia (liquid) were utilized in each run with varying quantities of sodium. The results are listed in Table I below.

TABLE I

| Example | Cosolvent | Sodium, g. | Mole Percent Yield of Monocarboxylate Acid (1 mole acid/2 at. wt. Na) |
|---|---|---|---|
| II | Toluene | 0.9 | 42 |
| III | Tetralin | 1 | 30 |
| IV | Decalin | 1 | 26 |
| V | Diethyl ether | 1 | 4 |
| VI | n-Heptane | 0.8 | 0 |

The results in Table I demonstrate that toluene, Tetralin, decalin and diethyl ether were suitable cosolvents in the process to hydrocarboxylate naphthalene and produce a monocarboxylic acid. Only with n-heptane, did the process produce an undetectable yield.

Example VII 20 ml. of liquid ammonia was added to 6.00 g. naphthalene and 1.0155 g. sodium metal under a nitrogen atmosphere. The apparatus was that described in Example I. The mixture was allowed to reflux for approximately one-half hour. Carbon dioxide gas was then introduced at a rate of about 200 ml. per minute until substantially all color was discharged. 200 ml. of distilled water was then added and half of the aqueous phase was filtered. The filtrate was acidified with phosphoric acid to obtain 0.81 g. of dihydronaphthoic acid (M.P. 72–78° C.). This corresponded to 1.60 grams of acid per gram of sodium, a 42 mole percent yield.

The above results demonstrate that an acid had been prepared from naphthalene, sodium, ammonia and carbon dioxide *without* a cosolvent. The melting point (72–78° C.) of this acid indicates that it is a dihydronaphthoic acid, a monocarboxylic acid.

Example VIII 90 g. of naphthalene was added under a slow stream of nitrogen to a one-liter flask. The flask was fitted with the apparatus described in Example I except that a larger magnetic stirrer was used. The flask and its contents were first cooled in a Dry Ice acetone bath and then ammonia gas was introduced into the flask until approximately 600 ml. of liquid ammonia had collected. 30 g. of sodium was added, the cold bath was removed, and the mixture was allowed to reflux under a nitrogen atmosphere. Approximately one-half hour after the addition of the sodium had been completed the knock-back condenser and glass stopper were replaced by tufts of glass wool and carbon dioxide was introduced at a rate of approximately 20 ml. per minute until most of the color was discharged (approximately 3–4 hours).

The product was stored overnight after which distilled water was added and the resulting aqueous solution of the sodium salt was acidified to produce the acid according to the procedures of Example VII. The acid had a melting point of 100–173° C. Analysis by mass spectrography showed that the product was predominantly naphthoic acid although about 10 weight percent of dihydronaphthoic acid was also present.

The above results demonstrate that a naphthoic acid and a dihydronaphthoic acid were prepared from naphthalene in the absence of a cosolvent. The results also demonstrate that substantial amounts of an aromatic acid (naphthoic) had been produced in Example VIII while a hydrogenated form (dihydronaphthoic) had been prepared in Example VII. In Example VIII, the rate of carbon dioxide addition relative to the weight of reactive mixture is less than the rate for Example VII since greater amounts of the reactive mixture were present in Example VIII, and the salt was stored overnight in Example VIII before water was added while in Example VII, the water was added to the salt within a short time.

Examples IX–X

Potassium, 1,6850 g. (Example IX), and lithium, 0.306 g. (Example X), were individually substituted for sodium in Example VII.

In each example, the product was contacted with distilled water and the aqueous solution acidified. 0.11 g. of an acid was obtained in Example IX (potassium) while less than 0.03 g. of an acid was obtained in Example X (lithium).

The above results demonstrate that acids were produced when potassium and lithium were individually substituted for sodium in the process of Example VII. The results (0.11 g. of acid in Example IX and less than 0.03 g. of acid in Example X) also indicate that potassium is more effective than lithium, although only 0.306 g. of lithium was utilized compared to 1.6850 g. of potassium.

Examples XI–XIII

Monocarboxylic acids were individually prepared from anthracene (Example XI) and diphenyl (Example XII) according to the procedures described in Example I. 0.64 g. of sodium was utilized with anthracene while 1.026 g. of sodium was utilized with diphenyl. In addition, a monocarboxylic acid was prepared from 150 ml. of 1-methylnaphthalene (Example XIII), obtained from the fractionation of Ultraformer bottoms, in addition to 100 ml. of toluene, 600 ml. of liquid ammonia, 30.3 g. of sodium, and carbon dioxide at the rate of 200 ml. per minute (until the color was substantially discharged) were utilized. The procedures described in Example I were employed to separate the acid in each example.

In Example XI (anthracene), approximately 0.39 g. of a white solid was produced from the acidification of one-half of the aqueous solution of the sodium salt. The solid melted at 201–207° C. Analysis of the acid by means of mass spectrometry revealed a molecular weight of 224 for the acid and indicated that the product was a dihydroanthracene carboxylic acid of exceptionally high purity. The acid was indicated to be 9,10-dihydro-9-anthroic acid, which, according to the literature, melts at 207° C. The yield of the acid was approximately 28 mole percent (based on a theoretical yield of 1 mole of acid per 2 atomic weights of sodium).

In Example XII (diphenyl), organic acids having a melting point of 59–80° C. were obtained in an amount corresponding to a 15 mole percent yield (based on 1 mole acid/2 at. wt. Na) of monocarboxylic acids of dihydrodiphenyl.

In Example XIII (1-methylnaphthalene), the acid melted at 117–149° C. and weighed 36.4 g. which corresponded to a yield of 70 mole percent (based on 1 mole acid/2 at. wt. Na).

The above results demonstrate that monocarboxylic acids were prepared from anthracene, diphenyl and 1-methylnaphthalene. All the acids precipitated from the acidification of an aqueous solution of the sodium salt. The dihydroanthroic acid melted at 201–207° C. (literature 207° C.) and resulted in a yield of 28 mole percent, the acid from diphenyl melted at 59–80° C. and resulted in a yield of 15 mole percent, while the acid from 1-methylnaphthalene melted at 117–149° C. and resulted in a yield of 70 mole percent.

Example XIV

A monothiocarboxy acid was next prepared from anthracene. 90 g. of anthracene and 100 ml. toluene were charged to a 3-necked one-liter flask fitted with a 3-way stop-cock for the introduction of gas into the vapor phase, a knock-back condenser, a glass stopper, and a large Teflon-covered magnetic stirring bar. With nitrogen flowing through the flask, the knock-back condenser was filled with Dry Ice and acetone, and the flask was placed in a bath of Dry Ice and acetone. Ammonia gas was introduced, with the stirrer on, and an additional 100 ml. of toluene was added. After the collection of about 600 ml. of liquid ammonia, the addition of ammonia was stopped, and 30.0 g. of sodium was added. The cooling bath was removed and the mixture was stirred for approximately one-half an hour. At the end of this time the knock-back condenser and glass stopper were removed and gaseous carbonyl sulfide was introduced into the vapor phase at a rate of about 200 ml. per minute. The treatment with carbonyl sulfide was continued for approximately four and a half hours, with stirring. During this time the color of the reaction mixture changed from reddish black to yellow and white with traces of reddish brown. About 700 ml. water was added and the oil and aqueous phases were separated. The aqueous phase was divided into six fractions, and 600 ml. water was added to each fraction. The fractions were then acidified with 85 percent (by weight) phosphoric acid to pH 7 and three level teaspoons of Darco G–60 vegetable charcoal were added to each. The resulting mixtures were stirred and then filtered to obtain clear yellow filtrates. These filtrates were acidified with additional phosphoric acid to pH 2. The precipitates thus obtained were filtered and dried in air to obtain 77.6 grams of golden yellow solid melting at 80–91° C. This corresponds to a 50-mole percent yield (based on 1 mole acid/2 at. wt. Na) of a thiocarboxy acid of dihydroanthracene. Analysis of the acid showed 13.74 weight percent sulfur, as compared with a theoretical value of 13.34 weight percent sulfur. The molecular weight determined by extrapolation was 249 compared to the theoretical value of 240.

The above results demonstrate that a monothiocarboxy acid of dihydroanthracene was prepared when carbonyl sulfide was reacted with a liquid mixture of anthracene, toluene, ammonia and sodium. Analysis of the acid which precipitated from an aqueous solution revealed a melting point of 80–90° C. a sulfur content of 13.74 weight percent compared to a theoretical value of 13.34 weight percent, and an expolated molecular weight of 249 compared to a theoretical value of 240.

Example XV

An ester of a monocarboxylic acid was prepared. 20 ml. liquid ammonia was added to 6.0 g. naphthalene, 10 ml. toluene, and 1.02 g. sodium metal under a nitrogen atmosphere and the mixture was allowed to reflux for approximately one-half hour. Carbon dioxide gas was then introduced at a rate of about 200 ml. per minute until substantially all color was discharged. The product was extracted twice with toluene and then 10 ml. benzyl chloride and 0.2 ml. triethylamine was added. The mixture was heated at approximately 100° C. for one hour with stirring and then was cooled and filtered, washing the solids with additional toluene. The toluene solution was then heated to a temperature of approximately 49° C. under a vacuum of 0.08 mm. Hg to distill off the toluene and unreacted benzyl chloride. The crude benzyl ester of dihydronaphthoic acid remaining in the flask weighed 2.72 g. corresponding to a 47 mole percent yield of ester from sodium, and had a refractive index of $N_D^{20.12}$: 1.5967. Analysis of the ester by means of mass spectrometry showed that both the normal and low voltage spectra support the structure benzyl dihydronaphthoate (264) as the main component.

The above results demonstrate that an ester was prepared which was predominantly benzyl dihydronaphthoate, as revealed by mass spectrometry. These results also demonstrate that the yield of the ester was 47 mole percent (based on 1 mole acid/2 at. wt. Na).

*Examples XVI–XVII*

The procedure described in Example XV was repeated except that a 50—50 mixture of air and carbon dioxide was used in place of only carbon dioxide. Mass spectrographic analysis of the benzyl esters, obtained in 14 mole percent yield (based on sodium), showed them to contain more benzyl naphthoate than benzyl dihydronaphthoate.

The procedure described in Example XV was repeated, except that the salt slurry, obtained after the treatment with carbon dioxide, was exposed to a stream of dry air over a period of approximately one hour. Mass spectrographic analysis of the benzyl esters, obtained in 49 mole percent yield (based on sodium), showed them to be a mixture of mainly benzyl dihydronaphthoate with lesser amounts of benzyl naphthoate.

The above results demonstrate that benzyl naphthoate and benzyl dihydronaphthoate were produced when a 50—50 mixture of air and carbon dioxide was introduced into the liquid mixture (Example XVI) and when the sodium salt (Example XVII) was treated with air. In addition, in Example XVI, mass spectrographic analysis revealed that the aromatic ester (benzyl naphthoate) was produced in larger quantities than the hydrogenated ester (benzyl dihydronaphthoate).

*Examples XVIII–XXIII*

The procedures described in Example XV was repeated except that no toluene was added until after the introduction of the carbon dioxide; and 1-chloronaphthalene (Example XVIII), acridine (Example XIX) and thianthrene (Example XX) were substituted for naphthalene. In the remaining examples, carbonyl sulfide and naphthalene (Example XXI); sulfur dioxide and naphthalene (Example XXII); and carbon disulfide and naphthalene (Example XXIII) were utilized.

In each example, an ester was produced. In Example XVIII, the chlorine content of the benzyl ester was 6.46 weight percent which corresponded to a 45 percent dehalogenated product. The yield was about 7 weight percent (based on 1 mole ester/2 at. wt. Na) of the ester of 1-chloronaphthalene.

In Example XIX, a 30-mole percent yield (based on 1 mole ester/2 at. wt. Na) of benzyl esters containing 4.95 weight percent nitrogen (theory: 4.44%) was obtained.

In Example XX, a 46-mole percent yield (based on 1 mole ester/2 at. wt. Na) of benzyl esters containing 17.87 weight percent sulfur (theory: 18.20%) was obtained.

In Example XXI, a portion of the product was filtered and analyzed by means of mass spectrometry. Peaks at masses 280 and 157 gave strong evidence for the assigned structure, benzyl dihydrothionaphthoate, while peaks at masses 278 and 155 suggested the presence of benzyl thionaphthoate also. The isotopic peak at 282 confirmed the presence of a sulfur atom in the ion of mass 280. Moreover, a metastable peak at 88.0 established that the ion of mass 280 is the immediate precursor of the ion of mass 157.

In Example XXII, mass spectrographic analysis of the reaction product revealed the presence of a small amount of a benzyl dihydrosulfinate.

In Example XXIII, 11.2 g. of the crude benzyl esters of dithiocarboxy and dihydrodithiocarboxy acids of naphthalene were obtained as a clear blood-red liquid with no detectable vapor pressure at 60° C., and with a refractive index of $N_D^{20.2}$:1.6775. The sulfur content was 22.9 weight percent as compared with the theoretical value of 21.6 weight percent. The weight of ester obtained corresponds to the formation of almost one (0.92) mole of product per atomic weight of sodium.

The above results from Examples XVIII–XXIII demonstrate that benzyl esters were prepared from 1-chloronaphthalene, acridine and thianthrene. These results also demonstrate that benzyl esters of sulfur containing acids were prepared when carbonyl sulfide, sulfur dioxide, and carbon disulfide were individually substituted for carbon dioxide in the process described in Example XVI. In addition, the results in Example XXIII demonstrate that unusually high yields result from carbon disulfide, naphthalene, sodium, and ammonia.

Thus having described the invention, what is claimed is:
9,10-dihydro-9-monothioanthroic acid.

References Cited by the Examiner
UNITED STATES PATENTS

| | | | |
|---|---|---|---|
| 2,027,000 | 1/1936 | Scott | 260—515 |
| 2,046,876 | 7/1936 | Jones. | |
| 2,259,869 | 10/1941 | Allen | 260—455 XR |
| 2,494,253 | 1/1950 | Miescher et al. | 260—455 XR |
| 2,816,918 | 12/1957 | Wynkoop | 260—515 |
| 2,855,397 | 10/1958 | Ramsden | 260—500 |
| 2,960,544 | 11/1960 | Mador et al. | 260—515 |

FOREIGN PATENTS
449,534   6/1936   Great Britain.

OTHER REFERENCES
Hansley: Ind. Eng. Chem. 43, 1759–1766 (1951).

CHARLES B. PARKER, *Primary Examiner.*

DANIEL D. HORWITZ, DALE R. MAHANAND, B. BILLIAN, *Assistant Examiners.*